# United States Patent Office 3,438,986
Patented Apr. 15, 1969

3,438,986
OXYALKYLATED NITROGEN COMPOUNDS
Donald W. Kaiser, Hamden, and John K. Zane, East Haven, Conn., assignors to Olin Mathieson Chemical Corporation, a corporation of Virginia
No Drawing. Filed May 21, 1965, Ser. No. 457,810
Int. Cl. C07d 55/32, 55/20; C08g 22/08
U.S. Cl. 260—249.6    7 Claims

ABSTRACT OF THE DISCLOSURE

Oxyalkylated aryl diamines are used as a solvent in the reaction between cyanoguanidine and an organo nitrile to yield a 2-organo-4,6-diamino-triazine, and used as a solvent in the oxyalkylation of the resulting triazine. The oxyalkylated aryl diamines, with or without the oxyalkylated triazine, are used as a reactant to effect cross-linking during the reaction of a polyol and an organic isocyanate in the presence of a catalyst and a foaming agent to yield a polyurethane foam.

---

This invention relates to the use of oxyalkylated nitrogen compounds in the preparation of polyurethane foams, and to compositions produced thereby.

Rigid urethane foams have been used extensively as insulation material in the preparation of structural members in the building trade, as insulation in refrigerators, freezers and the like, and for other insulating purposes. Flexible urethane foams have also been used extensively as upholstering material in the preparation of cushions, pillows and the like, as well as in the preparation of mattresses and mattress liners.

Although a wide variety of compounds have been employed in the preparation of urethane foams, one problem that exists in preparation of rigid foams is the need for a cross-linking agent which is capable of imparting the desired degree of rigidity to the resulting foam without adversely affecting the foaming rate.

Another problem encounterd in the preparation of urethane foams is the need for producing a foam which is substantially flame resistant. Although it is generally recognized that high proportions of nitrogen, phosphorous and/or chlorine atoms enhance the flame resistance of the resulting foam, present techniques for adding these components to urethane foam are not entirely satisfactory.

Employing oxyalkylated nitrogen compounds, such as oxyalkylated triazines, as a reactant in the preparation of urethane foams is one satisfactory technique for imparting a high nitrogen content and thus a high degree of flame resistance to the resulting urethane foam. However, these compounds are expensive to prepare due to the necessity of using a selected insert solvent which must be completely removed.

It is a primary object of this invention to overcome the disadvantages inherent in previously known techniques for preparing urethane foams from oxyalkylated nitrogen compounds.

Another object of this invention is to provide an improved process for preparing triazines.

Still another object of this invention is to provide an improved process for preparing oxyalkylated triazine.

It is another object of this invention to provide a process for preparing polyurethane foams from oxyalkylated nitrogen compounds.

A further object of the invention is to provide improved urethane foams having a high degree of flame resistance.

These and other objects of the invention will be apparent from the following description thereof.

It has now been discovered that the above-mentioned objects are accomplished when an oxyalkylated aryl diamine is employed as a solvent in the reaction of cyanoguanidine with an organo nitrile to yield a 2-organo-4,6-diamino-triazine as well as in the oxyalkylation of the resulting triazine. These objects are further accomplished when an oxyalkylated aryl diamine is employed as a reactant to effect cross linking during the reaction of a suitable polyether with an organic isocyanate in the presence of a catalyst and a foaming agent to yield a urethane foam.

Any aryl diamine capable of acting as a cross-linking agent in the preparation of urethane foams may be employed in carrying out the steps of the process of this invention. Typical examples of suitable aryl diamines include mononuclear primary amines such as o-, m-, and p-phenylenediamine; 2,4- and 2,6-diaminotoluene; 2,6-diamino-p-xylene; 4,6-diamino-m-xylene; 2,4-diamino-m-xylene; 3,5-diamino-o-xylene; isohexyl-p-phenylenediamine; 3,5-diaminotoluene; and the like; polynuclear and fused aromatic polyamines such as 1,4-naphthylenediamine; 1,5-naphthylenediamine; 1,8-naphthylenediamine; benzidine; tolidine; 4,4'-methylenedianiline; 3,3'-dimethoxy-4,4'-biphenyldiamine; 3,3'-dichloro-4,4'-biphenyldiamine; 3,3'-dimethyl-4,4'-biphenyldiamine; 4,4'-ethylenedianline; 4,4'-ethylidenedianiline; 1,4-anthradiamine; 3,3'-biphenyldiamine; 3,4-biphenyldiamine; 9,10-diaminophenanethrene; and 4,4'-diaminoazobenzene, mixtures thereof, and the like.

Any alkylene oxide containing between about 2 and about 6 carbon atoms may be employed to prepare the oxyalkylated aryl diamine. It is preferred to employ ethylene oxide, propylene oxide or other suitable alkylene oxides including, for example, butylene oxide, isobutylene oxide, N-hexyl oxide, mixtures thereof, and the like.

Any proportion of alkylene oxide is employed that will yield an oxyalkylated aryl diamine having a hydroxyl number in the range between about 30 and about 800.

The oxyalkylation reaction is accelerated by employing a basic catalyst such as the conventional organic or inorganic base activators. It is preferred to employ as a catalyst an alkali metal hydroxide, an alkali metal alkoxide or tertiary amine such as sodium hydroxide, potassium hydroxide, sodium alkoxide, such as sodium methylate, tributylamine, mixtures thereof, and the like.

The catalyst is generally employed in a proportion equivalent to between about 1 and about 5 percent by weight of the diamine compound, but any suitable catalytic proportion may be employed.

The oxyalkylation reaction may be exothermic at the beginning and then heat must be supplied to maintain the reaction at the desired temperature. Reaction temperatures in the range between about 100 and about 165° C. and preferably in the range between about 100 and between about 125° C. are employed. The reaction time is generally between about 2 and about 8 hours, but shorter or longer periods may be employed depending on the size of the batch.

After the oxyalkylation reaction is completed, the basic catalyst is neutralized with a mineral acid such as phosphoric acid, sulfuric acid, or hydrochloric acid. It is preferable to employ phosphoric acid for this purpose since the phosphorus component enhances the flame retarding properties of the resulting urethane foam. Excess phosphoric acid over that required to neutralize the basic catalyst is required to lower the pH of the oxyalkylated amino compounds to a pH range of 5.5–6.5.

After preparing the oxyalkylated aryl diamine in this manner, it may be employed either to prepare a urethane foam directly, or it may be first employed as a solvent in the preparation of triazines and oxyalkylated triazines, which are then employed to prepare a urethane foam. In each case, the oxyalkylated aryl diamine serves as a cross-linking agent in the preparation of the urethane foam.

In one embodiment of the invention the oxyalkylated aryl diamine is first employed as a solvent during the reaction of cyanoguanidine with an organic nitrile to yield a diamino triazine.

More in detail, the reaction of cyanoguanidine with the organic nitrile is represented by the following equation:

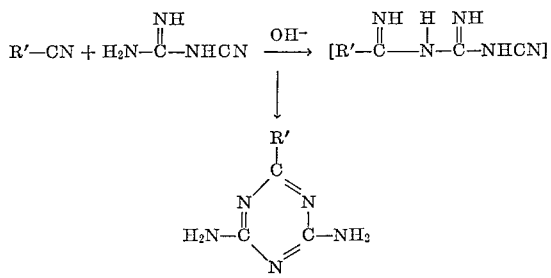

wherein R' is selected from the group consisting of alkyl having from 1 to about 23 carbon atoms, aryl having between about 6 and about 10 carbon atoms, alkylene having between about 6 and about 20 carbon atoms and heterocyclic having between about 4 and about 8 carbon atoms. Typical examples of suitable alkyl substituted nitriles are, for example, acetonitrile, trichloroacetonitrile, propionitrile, n-butyro and isobutyronitriles, isovaleronitrile, oenanthylonitrile, pelargononitrile, capronitrile, undecylonitrile, lauronitrile, myristonitrile, palmitonitrile, stearonitrile, behenonitrile, 2-ethylhexanonitrile, 2-methylhexanonitrile, 3-isopropylhexanonitrile and the like. Typical examples of suitable alkenyl-substituted nitriles are for example, undecylenonitrile, oleonitrile, eruconitrile and the like. Aryl-substituted nitriles which may be employed as a reactant in the preparation of the triazines are for example, benzonitrile, p-tolunitrile, and aryl alkyl-substituted nitriles such as phenylacetonitrile, and the like. Heterocyclic substituted nitriles which may be employed as a reactant include, for example, 2-cyanopyridine, 2-cyanofuran and the like. Mixtures of the various nitriles can be employed if desired, and in addition, all of the foregoing mentioned radicals can be substituted with non-interfering substituents or with reactive substituents which do not hinder the triazine reaction, the subsequent oxyalkylation reaction or the subsequent polyurethane reaction.

The proportion of oxyalkylated aryl diamine employed as a solvent in this embodiment is generally between about 0.5 part and about 10 parts, and preferably between about 1 part and about 2 parts by weight per part of cyanoguanidine employed as a reactant. However, larger or smaller proportions of the oxyalkylated aryl diamine may be employed if desired.

The reaction between cyanoguanidine and organo nitrile is conducted in the presence of a basic catalyst such as sodium hydroxide, potassium hydroxide, sodium methoxide and the like. Any catalytic portion of the catalyst which accelerates the rate of reaction may be employed. Generally a proportion in the range between about 0.1 and about 0.3 mole of basic catalyst per mole of the organo nitrile is employed but greater or lesser amounts may be employed if desired.

The temperature and time of the cyanoguanidine reaction will depend largely on the particular reactants employed, the catalyst employed and the proportions thereof. Thus, for example, the reaction between benzonitrile and cyanoguanidine is extremely exothermic and the reaction is difficult to control unless the benzonitrile is added stepwise to the cyanoguanidine.

Several advantages are obtained by employing an oxyalkylated aryl diamine as the solvent. For example, lower reaction temperatures may be employed while still obtaining a reasonably short reaction time. In addition, no pressure is required during the reaction as is required when liquid ammonia is used. Further, since the cyanoguanidine and nitriles are very soluble in this solvent, higher concentrations of reactants may be employed in the reaction, thereby markedly increasing the product yield above that obtained with conventional solvents. Since the oxyalkylated aryl diamine is advantageous in the urethane reaction, there is no need to separate the solvent when the resulting oxyalkylated triazine is used to prepare urethane foam. Another important advantage of the process is that a wide range of alkyl and alkenyl guanamines can be produced. Furthermore, the resulting triazine may be further reacted with an alkylene oxide to effect oxyalkylation thereof in the same reaction mixture and in the same reaction vessel if desired.

In accordance with the improved process of the present invention, any amino-1,3,5-triazine compound containing at least two amino groups may be oxyalkylated, whether prepared by the process described herein or otherwise. Exemplificative of such compounds are the 2,4,6-triamino-1,3,5-triazines, including melamine and substituted melamines, the 4,6-diamino-1,3,5-triazines, such as guanamines and formoguanamine, the 2-substituted-4,6-diamino-1,3,5-triazines and the substituted guanamines in general. Generally the hydrocarbon substituted triazines which may be employed have the following structural formula:

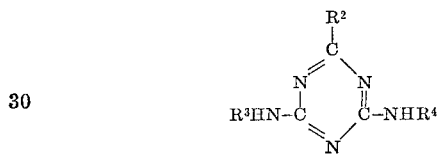

wherein $R^2$ is selected from the group consisting of hydrogen alkyl having from 1 to about 23 carbon atoms, aryl having between about 6 and about 10 carbon atoms, alkylene having between about 6 and about 20 carbon atoms, and heterocyclic having between about 4 and about 8 carbon atoms; and $-NR^5R^6$;

$R^3$ and $R^4$ are each independently selected from the group consisting of hydrogen, lower alkyl and aryl;

$R^5$ is selected from the group consisting of hydrogen, lower alkyl aryl and lower alkene; and $R^6$ is selected from the group consisting of hydrogen, lower alkyl and lower alkene.

The variable R's are as defined above with specific substituents varying within the entire range listed above. The lower alkyl radical in every case may be any alkyl radical containing from 1 to 6 carbon atoms, inclusive, such as methyl, ethyl, propyl, butyl, amyl, hexyl and isomers thereof. The lower alkene radical in every case may be any alkene radical containing from 4 to 6 carbon atoms, inclusive, such as butenyl, pentenyl, etc., and isomers thereof. Examples of aryl radicals include naphthyl, anthracyl, and preferably phenyl or chlorophenyl. In addition, all of the foregoing radicals may be substituted with non-interfering substituents or with reactive substituents which do no hinder the oxyalkylation reaction.

Throughout the present specification the term alkylene oxide is intended to include any alkylene oxide or alkylene oxide containing non-interfering substituents, such as hydroxyalkylene oxides, for example, glycidol, and aralkylene oxides, for example, styrene oxide. The unsubstituted alkylene oxides, especially the lower alkylene oxides are preferred, for example, ethylene oxide, propylene oxide, butylene oxide, isobutylene oxide, n-hexyl oxide, etc. The cycloalkylene oxides may also be used, for example, cyclohexylene oxide.

The oxyalkylation reaction is accelerated by employing an elevated temperature, i.e., from 75 to 175° C. and preferably from 90° to 140° C. and the use of a basic catalyst, such as the conventional organic or inorganic base activators. The catalyst is preferably an alkali metal hydroxide or alkoxide, such as sodium hydroxide, potassium hydroxide, sodium methoxide and the like. The reaction is initially exothermic and conventional cooling means are normally employed to maintain the reaction at the desired temperature. The reaction time is not critical and will vary depending upon the degree of completion desired, temperature and reactants.

The ratio of triazine to alkylene oxide may vary from 1:2 to 1:125. Thus it can be readily seen that oxyalkylated products may be tailor-made for particular properties depending upon the moles of alkylene oxide employed, i.e., in the reaction between said triazine and the alkylene oxide from 2 to 125 moles of alkylene oxide may be used per mole of triazine. The properties of the resultant compound will naturally vary depending upon the characteristics of the substituents and the number of moles of alkylene oxide employed.

The oxyalkylated triazines prepared in accordance with the process of the present invention which are especially desirable are the di- and triamino-1,3,5-triazines oxyalkylated with an unsubstituted alkylene oxide, especially an unsubstituted lower alkylene oxide, such as ethylene oxide, propylene oxide, butylene oxide, etc., due to the wide and inexpensive economic availability of these alkylene oxides and the excellent physical characteristics of the resultant oxyalkylated products.

The oxyalkylated triazine reaction product is acidified to neutralize the basic catalyst. The acid used for neutralization of the catalyst may be, for example, phosphoric, monoammonium phosphate, sulfonic, hydrochloric, trichloroacetic, sulfuric, etc., but phosphoric acid is preferred.

The mixture of oxyalkylated aryl diamine and oxyalkylated triazine produced by the process of this invention need not be separated into its component parts prior to reaction with an organic diisocyanate to form flexible, rigid, or semi-rigid foams, but instead the entire mixture may be employed in the process for preparing urethane foams.

In a preferred embodiment of the invention, an organic polyhydroxy compound is admixed with the mixture of oxyalkylated aryl diamine and oxyalkylated triazine and the resulting mixture is further oxyalkylated to form a polyether from the organic polyhydric alcohol. Any organic hydroxy compound containing between about 3 and about 8 hydroxyl compounds may be employed for this purpose. It is preferred to employ polyhydric alcohols such as glycerol, pentaerythritol, dipentaerythritol, and tripentaerythritol. Other polyhydric alcohols which may be conveniently employed include sorbitol, anhydroenneaheptitol, hexanetriol, trimethylol propane, trimethylol ethane, pyrogallol, mixtures thereof, and the like. In addition, any aminohydroxy compound having a functionality between about 3 and about 8 may be employed, such as monoethanolamine, diethanolamine, triethanolamine, mixtures thereof and the like.

The organic hydroxy compound component of the mixture is then oxyalkylated in accordance with the previously described oxyalkylation technique. The resulting oxyalkylated organic hydroxy compound component of the mixture substantially lowers the viscosity of the oxyalkylated aryl diamine and the oxyalkylated triazine components, thereby yielding an oxyalkylated polyol reactant which is easily handled in conventional apparatus used for preparing urethane foams.

Conventional foaming processes, in which a polyol is reacted with an organic isocyanate in the presence of a foaming agent, a catalyst, and a cross-linking agent, are markedly improved when employing an oxyalkylated aryl diamine, such as oxyalkylated toluene diamine, as a cross-linking agent. This novel improvement permits better control of the foaming rate, improves the rigidity of foams prepared thereby, and greatly enhances the flame resistance of the resulting urethane foam.

Any polyol capable of reacting with an organic isocyanate to yield a polyurethane may be employed. Examples of useful branched-chain polyols containing a plurality of functional hydroxyl terminal groups are the reaction products of glycerol, trimethylol propane, pentaerythritol, 1,2,6-hexane triol, phloroglucinol, trimethylol benzene, styrene-vinyl alcohol copolymer, sucrose, sorbitol and similar polyhydric materials reacted with glycols and the like such as propylene glycol, butylene glycol, mixtures of ethylene and propylene glycol and the like in the presence of catalysts with removal of water. They also may be reacted with alkylene oxides such as propylene oxide, butylene oxide, mixtures of ethylene oxide and propylene oxide and the like. Mixtures of the monomers forming the polyether polyols as well as the mixtures of the branched-chain polyether polyols themselves may be used.

Other suitable polyols are disclosed in U.S. Patent No. 3,072,582 issued to Charles Bedell Frost on Jan. 8, 1963. Another suitable polyol is the oxyalkylated polyol obtained by oxyalkylation of concentrated phosphoric acid in the presence of a polyol and a suitable catalyst. Such a polyol also enhances the flame resistance of the resulting urethane foam due to the incorporation of a relatively large proportion of phosphorus atoms into the foam structure.

A particularly suitable polyol compound useful in the preparation of polyurethane foams in accordance with the process of this invention is the aforesaid mixture of oxyalkylated aryl diamine, oxyalkylated triazine, and oxyalkylated organic hydroxy compound. A portion or all of the oxyalkylated aryl diamine serves as a cross-linking agent in the resulting foam. Employing such a mixture as the polyether is especially effective in yielding a urethane foam having superior flame resistant properties. This result is due primarily to the relatively large proportion of nitrogen atoms that are chemically combined in the urethane foam.

The polyol reactant, whether a single composition or a mixture of polyhydroxyl compositions, when used in the preparation of rigid polyurethane foams, preferably should have a hydroxyl number in the range between about 300 and about 800. In the preparation of semi-rigid polyurethane foams, the hydroxyl number of the polyol reactant should be in the range between about 100 and about 300. In the preparation of flexible polyurethane foams, the hydroxyl number of the polyol reactant should be between about 30 and about 100.

Any organic polyisocyanate may be employed in the preparation of the polyurethane foams, including diisocyanates, triisocyanates, and polyisocyanates. Organic diisocyanates are preferred due to commercial availability, especially mixtures of isomers of tolylene diisocyanate which are readily available commercially, such as the 4:1 mixture of the 2,4- and 2,6-isomers. Typical exemplificative isocyanates include, but are not limited to, the following: methylene-bis-(4-phenyl isocyanate), 3,3′-bitolylene-4,4′-diisocyanate, 3,3′-dimethoxy-4,4′-biphenylene diisocyanate, naphthalene-1,4-diisocyanate, hexamethylene diisocyanate, 1,4-phenylene diisocyanate, polymethylene polyisocyanate, mixtures thereof, and the like. The amount of isocyanate employed in the preparation of the polyurethane foams should be sufficient to provide at least 0.7 mole of NCO groups per mole of hydroxyl groups present in the polyol, and in any other reactant or additive used to prepare the foam. A proportion of isocyanate in excess of about 1.25 NCO groups per hydroxyl group is operable, but the use of these large proportions is generally undesirable due to the high cost of the isocyanate compounds. It is preferable, therefore, to employ a proportion of isocyanate which provides between about 0.8 and about 1.15 moles of NCO groups per mole of hydroxyl groups present.

In the preparation of urethane foams in accordance with the process of this invention, either the so-called "one shot method" or the "semiprepolymer technique" ("quasiprepolymer technique") may be employed.

The polyurethane foams are prepared in the presence of a foaming agent, a reaction catalyst, and a cross-linking agent. The foaming agent employed may be any of those known to be useful for this purpose, such as water, the halogenated hydrocarbons, and mixtures thereof. Typical halogenated hydrocarbons include, but are not limited to monofluorotrichloromethane, difluorodichloromethane, 1,1,2 - trichloro - 1,2,2-trifluoroethane, methylene chloride, chloroform, carbon tetrachloride, mixtures thereof, and the like. The amount of blowing agent employed may be varied within a wide range. Generally, however, the halogenated hydrocarbons are employed in an amount from 1 to 50 parts by weight per 100 parts by wegiht of the polyol, and generally the water is employed in an amount of from 0.1 to 10 parts by weight per 100 parts by weight of the polyol.

The polyurethane foams are prepared in the presence of a catalytic amount of a reaction catalyst. The catalyst employed may be any of the catalysts known to be useful for this purpose, including tertiary amines and metallic salts. Typical tertiary amines include, but are not limited to, N-methyl morpholine, N-hydroxyethyl morpholine, triethylene diamine, triethylamine, trimethylamine and mixtures thereof. Typical metallic salts include, for example, the salts of antimony, tin, and iron, e.g., dibutyltin dilaurate, stannous octoate, etc., and mixtures thereof. Generally speaking, the catalyst is employed in an amount from 0.1 to 2.0 percent by weight based on the polyol, but any catalytic proportion capable of accelerating the reaction may be employed.

The proportion of oxyalkylated aryl diamine added as a cross-linking agent to the reactants will vary with the degree of rigidity desired in the resulting urethane foam. Generally the proportion of oxyalkylated aryl diamine added to the reactants as a cross-linking agent is equivalent to between about 2 and about 50 percent, and preferably between about 10 and about 35 percent by weight of the polyether. Employing an oxyalkylated aryl diamine as a cross-linking agent in this manner significantly reduces the cost of preparing the urethane foams, since it is substantially less expense than conventional cross-linking agents. In addition, since it is not as basic as alkyl amine cross-linking agents, there is better control of the foaming step during processing. In addition, a more rigid foam can be prepared employing the oxyalklated aryl diamine as a cross-linking agent than can be obtained with convenientional cross-linking agents.

The polyurethane foams of the present invention may be prepared directly by the reaction between the polyether and organic polyisocyanate in the presence of a foaming agent, cross-linking agent and reaction catalyst. Optionally, various additives may be employed in the preparation of the polyurethane foams in order to achieve particular properties. Exemplificative of such additives include, but are not limited to monocarboxylic acids, polycarboxylic acids, polyesters, monohydroxy compounds, polyhydroxy compounds, etc.

It is preferred in the preparation of the polyurethane compounds of the present invention to employ minor amounts of a surfactant in order to improve the cell structure of the polyurethane foam. Typical of such surfactants are the silicone oils, and soaps. Generally up to 2 parts by weight of the surfactant is employed per 100 parts of polyether.

Various other additives can be employed which serve to provide different properties, e.g., fillers, such as clay, calcium sulfate, or ammonium phosphate may be added to lower cost and improve physical properties. Ingredients such as dyes may be added for color, and glass fibers, asbestos, or synthetic fibers may be added for strength. In addition, plasticizers, deordorants, and anti-oxidants may be added.

The process of the present invention will be more readily apparent from a consideration of the following illustrative examples. All parts and percentages are by weight unless indicated otherwise.

EXAMPLE 1

Tolylenediamine copropoxylated with benzoguanamine and pentaerythritol for rigid foam A mixture of 122 g. (1.0 mole) of tolylenediamine (a mixture of 2,4- and 2,6-isomers in a ratio of about 4:1) and 1.0 g. of dry sodium methylate was stirred and heated to 150° C. and reacted with 239 g. of propylene oxide. The brown liquid was allowed to cool to 100° C. and 100.8 g. (1.2 moles) of dicyandiamide plus 6.6 g. (0.10 mole) of 85% potassium hydroxide were added. After stirring the slurry for 15 minutes, 103 g. (1.0 mole) of benzonitrile was added, giving a thinner slurry. The reaction, in which benzoguanamine was formed, slowly became exothermic and the temperature rose to a maximum of 140° C. A very thick slurry of benzoguanamine formed. When the exothermic reaction subsided, the mixture was heated at 150° C. for ½ hour, allowed to cool, and stand at room temperature overnight.

Propoxylation was continued at 125° C. and after a total of approximately 839 g. of oxide had reacted, 136 g. (1.0 mole) of pentaerythritol was added to the hot solution. Propoxylation was then completed. A total of 1253 g. of propylene oxide was employed. When the temperature fell to 100° C., 69 g. of 85% phosphoric acid was added, giving a pH of 6. To raise the pH, 20 g. of concentarted ammonia solution was added, After addition of 75 g. of Attapulgus clay, the stirred mixture was concentrated under reduced presure to remove water. The final stripping temperature was 150° C. at 1-2 mm. The filtered syrup gave the following analysis:

Hydroxyl number _____ 369.7
Acid number _____ 0.2
Apparent pH (10:6 Isopropanol:Water) __ 9.1
Percent water _____ 0.06; 0.06

EXAMPLE 2

Tolylenediamine copropoxylated with acetoguanamine and pentaerythritol for rigid foam A stirred mixture of 122 g. (1.0 mole) of tolylenediamine and 1 g. of dry sodium methylate was heated to 150–160° C. and propoxylated with 309 g. of propylene oxide. A reddish syrup formed.

After cooling, 100.8 g. (1.2 moles) of dicyandiamide and 6.6 g. (0.10 mole) of 85% potassium hydroxide was added and the mixture stirred at 95° C for a half hour to dissolve the alkali. Within 5 minutes, 45.1 g. (1.10 moles) of acetonitrile was added, giving a thinner slurry. The temperature slowly rose to 106° C. and the fell. Heat was applied again and reflux of the nitrile occurred at 115° C. As reflux disappeared, the temperature was gradually raised. No reflux occurred after a total time of 1¾ hours. A thick slurry of acetoguanamine was present. Propoxylation was carried out at 150° C. Reaction with 474 g. of the oxide gave a slightly turbid, brown solution.

Addition of 136 g. (1.0 mole) of pentaerythritol then followed, and propoxylation was completed. The total weight of reacted propylene oxide was 1322 g. Addition of 57.5 g. of 85% phosphoric acid gave a pH of 6.5–7.0. The pH was raised by addition of 20 g. of 28% aqueous ammonia. The mixture was concentrated under reduced pressure to remove water after addition of 75 g. of Attapulgus clay. Filtration followed a final stripping at 150° C./1–2 mm. Analysis gave the following results:

Hydroxyl number _____ 397
Acid number _____ 3.1
Apparent pH (10:6 Isopropanol:Water) _____ 8.58
Percent water _____ 0.03; 0.03

EXAMPLE 3

Tolylenediamine propoxylated for rigid foam

A stirred mixture of 244 g. (2.0 moles) of distilled tolylenediamine and 2.0 g. of dry sodium methylate was heated to 150° C. and a total of 984 g. of propylene oxide was reacted in six hours. The material was allowed to stand at room temperature overnight.

The polyol was treated with 5 g. of 85% phosphoric acid to neutralize the catalyst and lower the pH. After the addition of 50 g. of Attapulgus clay, water was removed by vacuum stripping. A final stripping for 1½ hours at 120° C./0.3 mm. preceded filtration.

The polyol gave the following analysis:

Hydroxyl number _____ 401
Acid number _____ 0.041
Apparent pH (10:6 Isopropanol:Water) _____ 8.14

EXAMPLE 4

Tolylenediamine propoxylated for rigid foam

Employing a similar procedure as in Example 3, 488 g. (4.0 moles) of tolylenediamine, with 4.0 g. of sodium methylate, was propoxylated with a total of 2008 g. of propylene oxide.

Ten grams of 85% phosphoric acid, and 100 g. of Attapulgus clay were added to the polyol and water stripped under vacuum. The final conditions were 140° C./<1.0 mm.

The filtered polyol gave the following analysis:

Hydroxyl number _____ 361; 359
Acid number _____ 0.83
Acid in pyridine _____ 2.35
Apparent pH (10:6 Isopropanol:Water) _____ 6.75

EXAMPLE 5

Tolylenediamine propoxylated for a cross-linking agent for rigid foam

Using the procedure of Example 3, 366 g. (3.0 moles) of tolylenediamine, with 3.0 g. of dry sodium methylate as catalyst, was propoxylated with 704 g. of propylene oxide.

The polyol was treated with 7.0 g. of 85% phosphoric and 30 g. of Attapulgus clay. After stripping at 150° C./<1.0 mm., the viscous material was allowed to cool, diluted with 500 ml. of acetone, to reduce viscosity, and filtered.

The acetone was removed from the filtrate under reduced pressure. The polyol gave the following analysis:

Hydroxyl number _____ 575; 576
Acid number _____ 0.284
Acid in pyridine _____ 1.2
Apparent pH (10:6 Isopropanol:Water) _____ 9.9

EXAMPLE 6

A polyol was prepared by propoxylating a mixture of potato starch and phosphoric acid to yield a polyol having a hydroxyl number of 485. The mixture, prior to propoxylation, was a mixture of 105% phosphoric acid, 85% phosphoric acid and starch in a ratio of 5 moles P as 105% acid:1 mole P and 85% acid:1 glucose unit weight of starch (162 grams). Ninety parts by weight of this polyol was admixed with ten parts by weight of a propoxylated toluene diamine prepared by a process similar to Example 5 having a hydroxyl number of 620. These components were admixed with additional components in proportions set forth in the following table to yield a polyurethane foam.

Component: Proportion

Polyol (OH# 485) _____ 90
    Propoxylated toluene diamine (OH# 620) ___ 10
    Dimethyl ethanol amine _____ 2.0
    Triethylene diamine _____ 0.2
    Blocked silicone surfactant _____ 2
    Trichlorofluoromethane _____ 37
    Polyphenyl-dimethylene triisocyanate [1] _____ 125

[1] Sold commercially under the tradename "Papi" by Carwin Chemical Company.

The properties of the resulting foam are set forth in the following table as Example 6.

For purposes of comparison the procedure was repeated with the exception that the propoxylated toluene diamine of this example was replaced with a conventional cross-linking agent, propoxylated ethanolamine. The properties of the resulting foam are set forth below in the following table as Test A.

For purposes of further comparison, the procedure for preparing a polyurethane foam was repeated with the exception that no cross-linking agent was employed. The properties of the resulting foam are set forth in the following table as Test B.

| Property | Example 6 | Test A | Test B |
|---|---|---|---|
| Core density, pounds per cubic foot_ | 1.7 | 1.6 | 1.9 |
| Humid aging at 158° F., 100 percent relative humidity, percent volume change after seven days_____ | 0 | 1 | 18 |
| Humid aging at −20° F., percent volume change after seven days__ | 0.5 | 0 | 1 |
| K factor_____ | 0.143 | 0.157 | 0.135 |

An analysis of the above results indicated that propoxylated toluene diamine imparts improved properties to the foam. It is as effective as a conventional cross-linking agent in improving the humid aging properties and is superior to conventional cross-linking agents with respect to improving the K factor.

EXAMPLE 7

A polyol was prepared by propoxylating a mixture of methyl glucoside and glycerine in the presence of a catalytic proportion of potassium hydroxide. The molar ratio of reactants was 4:1:27.25 of methyl glucoside:glycerine: propylene oxide and the resulting polyol had a hydroxyl number of about 435.

Propoxylated toluene diamine was prepared by a process similar to Example 5, and the resulting propoxylated toluene diamine had a hydroxyl number of 642.

These components were admixed with additional components in the proportions set forth in the following table to yield a polyurethane foam.

Component: Proportion

Polyol (OH #435) _____ 120
    Propoxylated toluene diamine (OH #642) ____ 180
    Blocked silicone surfactant _____ 6.0
    Trichlorofluoromethane _____ 108
    Tetramethylbutanediamine _____ 6.0
    "PAPI" _____ 423

The properties of the resulting foam are set forth in the following table as Example 7.

For purposes of comparison the procedure was repeated with the exception that 300 parts of the polyol were employed to prepare a foam and no propoxylated toluene diamine was employed. The properties of the resulting foam are set forth below in the following table as Test C.

| Property | Example 7 | Test C |
|---|---|---|
| Foam density, pounds per cubic foot_____ | 2.0 | 2.1 |
| Compressive strength, p.s.i.: | | |
|   (a) Parallel_____ | 49.6 | 33.2 |
|   (b) Perpendicular_____ | 17.3 | 16.8 |
| K factor: | | |
|   (a) L_____ | 0.127 | 0.132 |
|   (b) A_____ | 0.174 | 0.180 |
| Moisture vapor transmission, perm. per inch: | | |
|   (a) Parallel_____ | 3.6 | 7.2 |
|   (b) Perpendicular_____ | 1.4 | 2.1 |
| Percent change in volume after aging seven days: | | |
|   (a) At 158° F., 100% relative humidity_ | 5.7 | 8.1 |
|   (b) 158° F., dry_____ | 1.4 | 2.5 |
|   (c) −20° F._____ | −0.7 | 0.5 |

A comparison of these results shows that employing an equivalent weight of propoxylated toluene diamine as the polyol improves the compressive strength, the K

EXAMPLE 8

Following the procedure similar to Example 5, a propoxylated toluene diamine having a hydroxyl number of 563 was prepared. This material was employed to prepare a urethane foam in accordance with the procedure similar to Example 7, with the exception that no polyol was employed. The resulting foam had the following properties.

| Property: | Example 8 |
|---|---|
| Density, p.c.f. | 2.0 |
| Compressive strength, p.s.i. | 40 |
| Porosity, percent | 91 |
| K factor | 0.128 |
| Percent volume change after aging seven days at 158° F., 100% relative humidity | 4.0 |

Various modifications of applicants' invention, some of which have been referred to above, may be employed without departing from the spirit of applicants' invention.

What is desired to be secured by Letters Patent is:

1. In the process of preparing oxylakylate amino-1,3,5-triazines containing at least two amino groups by reacting said triazines with an alkylene oxide in the presence of a solvent and a basic catalyst, the improvement which comprises employing as said solvent an oxyalkylated aryl diamine.

2. The process of claim 1 wherein said solvent is oxyalkylated toluene diamine.

3. In the process of preparing a triazine by reacting cyanoguanidine with an organic nitrile in the presence of a solvent, the improvement which comprises employing as the solvent an oxyalkylated aryl diamine.

4. The process of claim 3 wherein said solvent is oxyalkylated toluene diamine.

5. In the process of preparing in a first step an amino-1,3,5-triazine compound containing at least two amino groups by reacting cyanoguanidine with an organic nitrile in the presence of a solvent, and in a second step reacting said triazine with an alkylene oxide in the presence of a solvent and a basic catalyst, the improvement which comprises employing an oxyalkylated aryl diamine as the solvent in said first step and in said second step.

6. The process of claim 5 wherein said solvent is oxyalkylated toluene diamine.

7. The process of claim 5 wherein said solvent is propoxylated toluene diamine.

References Cited

UNITED STATES PATENTS

| | | | |
|---|---|---|---|
| 1,712,716 | 5/1929 | Reddelien et al. | 73—228 |
| 2,777,848 | 1/1957 | Schaefer | 260—249.9 |
| 3,072,582 | 1/1963 | Frost | 260—2.5 |
| 3,075,927 | 1/1963 | Lanham | 260—2.5 |
| 3,256,281 | 6/1966 | Kaiser et al. | 260—249.9 XR |
| 3,330,830 | 7/1967 | Kaiser | 260—249.9 XR |

HENRY R. JILES, *Primary Examiner.*

JOHN M. FORD, *Assistant Examiner.*

U.S. Cl. X.R.

260—2.5, 32.6, 249.9